US012689072B2

(12) United States Patent
Nam et al.

(10) Patent No.: US 12,689,072 B2
(45) Date of Patent: Jul. 21, 2026

(54) METHOD FOR DETECTING LITHIUM PLATING, AND METHOD AND DEVICE FOR MANAGING BATTERY BY USING SAME

(71) Applicant: LG ENERGY SOLUTION, LTD., Seoul (KR)

(72) Inventors: Gi-Min Nam, Daejeon (KR); Won-Tae Joe, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 826 days.

(21) Appl. No.: 17/797,501

(22) PCT Filed: Nov. 13, 2020

(86) PCT No.: PCT/KR2020/016037
§ 371 (c)(1),
(2) Date: Aug. 4, 2022

(87) PCT Pub. No.: WO2021/157821
PCT Pub. Date: Aug. 12, 2021

(65) Prior Publication Data
US 2023/0046633 A1      Feb. 16, 2023

(30) Foreign Application Priority Data

Feb. 5, 2020      (KR) ......................... 10-2020-0013899

(51) Int. Cl.
*H01M 10/48*          (2006.01)
*H01M 10/0525*        (2010.01)
*H01M 10/42*          (2006.01)

(52) U.S. Cl.
CPC ....... *H01M 10/48* (2013.01); *H01M 10/0525* (2013.01); *H01M 10/4257* (2013.01); *H01M 2010/4271* (2013.01); *H01M 2220/20* (2013.01)

(58) Field of Classification Search
CPC ............. H01M 10/48; H01M 10/4257; H01M 2010/4271; G01R 31/392; G01R 31/3835
See application file for complete search history.

(56) References Cited

U.S. PATENT DOCUMENTS 11,237,216 B1 * 2/2022 Chang ................... G01R 31/392
2010/0264929 A1 10/2010 Ugaji et al.
(Continued)

FOREIGN PATENT DOCUMENTS

CN      102834727 A      12/2012
CN      103081212 A      5/2013
(Continued)

OTHER PUBLICATIONS

Extended European Search Report for European Application No. 20917560.3, dated Mar. 13, 2023.
(Continued)

*Primary Examiner* — Allison Bourke
*Assistant Examiner* — Travis L. Martin
(74) *Attorney, Agent, or Firm* — Birch, Stewart, Kolasch & Birch, LLP

(57) ABSTRACT

Provided are a lithium plating detection method, a battery management method and apparatus for safety diagnosis using the lithium plating detection method. The lithium plating detection method according to the present disclosure includes detecting, accumulating and tracking each of an open circuit voltage (OCV) after fully charging and an OCV after fully discharging of a battery every charge/discharge cycle of the battery, and determining if lithium plating took place in the battery using a result of tracking the OCV after fully charging and the OCV after fully discharging, wherein a range satisfying a condition of the reduced OCV after fully (Continued)

charging and the reduced OCV after fully discharging in the tracking result is determined as a range in which lithium plating starts to take place.

9 Claims, 6 Drawing Sheets

(56) References Cited

U.S. PATENT DOCUMENTS

| | | | |
|---|---|---|---|
| 2012/0179398 | A1 | 7/2012 | Ueki et al. |
| 2013/0030739 | A1 | 1/2013 | Takahashi et al. |
| 2013/0076363 | A1 | 3/2013 | Takahashi et al. |
| 2013/0099794 | A1 | 4/2013 | Takahashi et al. |
| 2015/0100261 | A1 | 4/2015 | Wang |
| 2016/0190658 | A1 | 6/2016 | Ishibashi et al. |
| 2017/0038436 | A1 | 2/2017 | Montaru |
| 2017/0203660 | A1 | 7/2017 | He et al. |
| 2017/0234930 | A1 | 8/2017 | Lee et al. |
| 2017/0259687 | A1* | 9/2017 | Chikkannanavar .......................... H02J 7/00308 |
| 2017/0279171 | A1 | 9/2017 | Ishibashi |
| 2018/0284195 | A1* | 10/2018 | K ...................... H01M 10/052 |
| 2018/0313906 | A1* | 11/2018 | Takahashi .......... G01R 31/3842 |
| 2019/0031035 | A1 | 1/2019 | Koch |
| 2019/0379090 | A1 | 12/2019 | Verbrugge et al. |

FOREIGN PATENT DOCUMENTS

| | | | |
|---|---|---|---|
| CN | 103901347 | A | 7/2014 |
| CN | 105866695 | A | 8/2016 |
| CN | 106461732 | A | 2/2017 |
| CN | 100298341 | A | 2/2019 |
| CN | 109449516 | A | 3/2019 |
| CN | 102844931 | A | 5/2026 |
| JP | 2009-162750 | A | 7/2009 |
| JP | 2010-66229 | A | 3/2010 |
| JP | 2010-66232 | A | 3/2010 |
| JP | 4588614 | B2 | 12/2010 |
| JP | 2014-32826 | A | 2/2014 |
| JP | 6225340 | B2 | 11/2017 |
| JP | 2017-223454 | A | 12/2017 |
| JP | 2017-223536 | A | 12/2017 |
| JP | 6535890 | B2 | 7/2019 |
| KR | 10-2017-0023583 | A | 3/2017 |
| KR | 10-1998069 | B1 | 7/2019 |
| WO | WO 2011/039882 | A1 | 4/2011 |
| WO | WO 2019/194205 | A1 | 10/2019 |

OTHER PUBLICATIONS

International Search Report (PCT/ISA/210) issued in PCT/KR2020/016037 mailed on Feb. 23, 2021.

* cited by examiner

METHOD FOR DETECTING LITHIUM PLATING, AND METHOD AND DEVICE FOR MANAGING BATTERY BY USING SAME

TECHNICAL FIELD

The present disclosure relates to a battery management method and apparatus, and more particularly, to a method for determining if lithium plating took place in a lithium ion battery in a nondestructive manner and a battery management method and apparatus for safety diagnosis of the battery using the method. The present application claims the benefit of Korean Patent Application No. 10-2020-0013899 filed on Feb. 5, 2020 with the Korean Intellectual Property Office, the disclosure of which is incorporated herein by reference in its entirety.

BACKGROUND ART

Recently, with the dramatic increasing demand for portable electronic products such as laptop computers and mobile phones and the growing demand for electric carts, electric wheelchairs and electric bikes, studies are being intensively made on high performance batteries that can be recharged repeatedly. More recently, with the gradual exhaustion of carbon energy and the increasing interest in environment, the global demand for hybrid electric vehicles (HEVs) and electric vehicles (EVs) is gradually increasing.

Accordingly, deeper interest and more intensive studies concentrate on automotive batteries as a key component of HEVs or EVs.

Lithium ion batteries are the most realistic technology for high performance batteries and automotive batteries. A lithium ion battery works by repeated intercalation and deintercalation of lithium ions at a negative electrode and a positive electrode. A lithium salt-containing electrolyte in which lithium ions move but electrons do not move is present between the electrodes.

Many battery studies are being made towards higher capacity and higher density, but it is also important to improve the life and safety. To this end, it is necessary to inhibit a decomposition reaction with an electrolyte solution on the electrode surface, and prevent overcharge/overdischarge. In particular, there is a need to prevent the deposition of lithium, so-called lithium-plating (Li-plating), on the negative electrode surface. The reason is that lithium plating not only causes side reactions with the electrolyte solution and changes in kinetic balance of the battery, resulting in degradation of the battery such as capacity loss, but also affects the life of the battery and causes a safety problem with loss of an overcharge control function.

Conventionally, however, it is very difficult to detect lithium plating in batteries in real time. Earlier non-destructive detection of lithium plating on the negative electrode includes discharging at low temperature, heat capacity analysis and thickness increase analysis. However, they do not involve measuring in an environment in which batteries are used. Therefore, there is a need for real-time detection of lithium plating in an actual use environment of batteries.

There have been proposed methods that determines a point in time at which an inflection point occurs in a negative electrode potential graph as a point in time at which lithium plating takes place through negative electrode potential observation during charging. However, it is impossible to detect only the negative electrode potential in actual use environments of batteries. In addition, batteries disassembled to observe the negative electrode potential cannot be used again.

DISCLOSURE

Technical Problem

The present disclosure is directed to providing a lithium plating detection method that can be used even when it is impossible to measure only the negative electrode potential while in use like an automotive battery, and does not need to disassemble the battery.

The present disclosure is further directed to providing a battery management method and apparatus for safety diagnosis by detecting if lithium plating took place in a battery using the lithium plating detection method.

Technical Solution

To solve the above-described problem, a lithium plating detection method according to the present disclosure includes detecting, accumulating and tracking each of an open circuit voltage (OCV) after fully charging and an OCV after fully discharging of a battery every charge/discharge cycle of the battery, and determining if lithium plating took place in the battery using a result of tracking the OCV after fully charging and the OCV after fully discharging, wherein a range satisfying a condition of the reduced OCV after fully charging and the reduced OCV after fully discharging in the tracking result is determined as a range in which lithium plating starts to take place.

Preferably, the lithium plating detection method further includes calculating, accumulating and tracking a Coulomb efficiency of the battery every charge/discharge cycle of the battery, wherein a range satisfying a condition of the reduced Coulomb efficiency as well in the tracking result is determined as the range in which lithium plating starts to take place.

A battery management method according to the present disclosure uses the lithium plating detection method.

The method includes (a) detecting and recording an OCV after initial fully charging and an OCV after initial fully discharging of a battery, (b) detecting and recording an OCV after next fully charging and an OCV after next fully discharging of the battery, and (c) determining whether each of the OCV after fully charging and the OCV after fully discharging increases, reduces and is maintained by comparing an immediately previous detected and recorded OCV after fully charging with a newly detected and recorded OCV after fully charging, and comparing an immediately previous detected and recorded OCV after fully discharging with a newly detected and recorded OCV after fully discharging, wherein the steps (b) and (c) are repeatedly performed, and in the step (c), when a condition of the reduced OCV after fully charging and the reduced OCV after fully discharging is satisfied, it is determined that lithium plating starts to take place.

Preferably, the battery management method further includes calculating and further recording a Coulomb efficiency of the battery in the steps (a) and (b), and determining whether the Coulomb efficiency increases, reduces and is maintained by comparing an immediately previous recorded Coulomb efficiency with a newly recorded Coulomb efficiency in the step (c), wherein the step (c) includes determining that lithium plating starts to take place when a condition of the reduced Coulomb efficiency is satisfied as well.

In the battery management method according to the present disclosure, the battery is a battery mounted on an electric vehicle, and when it is determined that lithium plating starts to take place, it is used as a warning point to a user.

Preferably, the battery management method further includes measuring the OCV of the battery each time 1% of total accumulated energy guaranteed is reached while repeatedly performing the steps (b) and (c). In this instance, the OCV measurement of the battery may be performed from SOC 0% to 100% at 0.05 C in a charging direction.

Meanwhile, in the battery management method according to the present disclosure, a lithium plating occurrence range may be from a point in time at which lithium plating start to take place to a point in time at which the OCV after fully charging and the OCV after fully discharging start to be maintained, and when the OCV after fully charging reduces and the OCV after fully discharging increases to a greater extent than an extent of change in the lithium plating occurrence range, the battery may be determined to be impossible to use.

Likewise, a lithium plating occurrence range may be from a point in time at which lithium plating starts to take place to a point in time at which the OCV after fully charging and the OCV after fully discharging are maintained, and when the OCV after fully charging reduces, the OCV after fully discharging increases and the Coulomb efficiency reduces to a greater extent than an extent of change in the lithium plating occurrence range, the battery may be determined to be impossible to use.

When discharging ends before the battery is fully discharged, the battery management method according to the present disclosure may include measuring the OCV after the discharging ends, estimating the OCV after fully discharging by extrapolation and recording the same.

A battery management apparatus according to the present disclosure is a suitable apparatus for performing the battery management method according to the present disclosure.

The apparatus includes a detection unit to detect an OCV after fully charging and an OCV after fully discharging of a battery every charge/discharge cycle of the battery, a storage unit to accumulate and record a result of the detection by the detection unit, and a determination unit to determine whether each of the OCV after fully charging and the OCV after fully discharging increases, reduces or is maintained by comparing an immediately previous detected and recorded OCV after fully charging with a newly detected and recorded OCV after fully charging, and comparing an immediately previous detected and recorded OCV after fully discharging with a newly detected and recorded OCV after fully discharging, wherein the determination unit determines that lithium plating starts to take place when a condition of the reduced OCV after fully charging and the reduced OCV after fully discharging is satisfied.

The storage unit may further accumulate and record a Coulomb efficiency every charge/discharge cycle of the battery, the determination unit may further determine whether the Coulomb efficiency increases, reduces or is maintained by comparing an immediately previous recorded Coulomb efficiency with a newly recorded Coulomb efficiency, and the determination unit may determine that lithium plating starts to take place when a condition of the reduced Coulomb efficiency is satisfied as well.

In the battery management apparatus according to the present disclosure, the battery may be a battery mounted on an electric vehicle, and when it is determined that lithium plating starts to take place in the battery by the determination unit, a warning may be provided to a user.

In the battery management apparatus according to the present disclosure, a lithium plating occurrence range may be from a point in time at which lithium plating starts to take place to a point in time at which the OCV after fully charging and the OCV after fully discharging start to be maintained, and the determination unit may determine that the battery is impossible to use when the OCV after fully charging reduces and the OCV after fully discharging increases to a greater extent than an extent of change in the lithium plating occurrence range.

In the battery management apparatus according to the present disclosure, a lithium plating occurrence range may be from a point in time at which lithium plating starts to take place to a point in time at which the OCV after fully charging and the OCV after fully discharging are maintained, and the determination unit may determine that the battery is impossible to use when the OCV after fully charging reduces, the OCV after fully discharging increases and the Coulomb efficiency reduces to a greater extent than an extent of change in the lithium plating occurrence range.

When discharging ends before the battery is fully discharged, the detection unit may measure the OCV after the discharging ends, estimate the OCV after fully discharging by extrapolation and record the same.

The battery management apparatus according to the present disclosure may temporarily stop charging the battery when the battery is determined to be impossible to use by the determination unit.

Advantageous Effects

According to the present disclosure, it is possible to detect lithium plating in real time in an environment in which a lithium ion battery is actually used. This method can detect in real time, in a non-destructive manner, and in an actual use environment, thereby accurately determining the condition of the battery.

The method of the present disclosure can be applied to not only battery cells but also modules/packs, thereby determining if lithium plating took place without needing to disassemble cells/modules/packs. It is possible to improve safety by detecting lithium plating that may take place while vehicles are driving and sending danger signals to users.

According to the present disclosure, it is possible to accurately detect the condition of batteries in a convenient manner while the batteries are being used, and deal with lithium plating situations rapidly, thereby preventing accidents that may occur when the degraded batteries are used.

BRIEF DESCRIPTION OF THE DRAWINGS

The accompanying drawings illustrate a preferred embodiment of the present disclosure and together with the foregoing disclosure, serves to provide further understanding of the technical spirit of the present disclosure. However, the present disclosure is not construed as being limited to the drawing.

DETAILED DESCRIPTION

Hereinafter, the preferred embodiments of the present disclosure will be described in detail with reference to the accompanying drawings. However, the present disclosure is not limited to the embodiments disclosed below and will be embodied in a variety of different forms, and this embodiment is only provided to fully disclose the present disclosure, and give those skilled in the art a complete understanding of the scope of the present disclosure.

In the following embodiment, a battery is a lithium ion battery. Here, the lithium ion battery refers collectively to batteries in which electrochemical reactions occur in the positive and negative electrodes by the action of lithium ions as working ions during charging and discharging.

Meanwhile, it should be interpreted that the lithium ion battery encompasses any battery using lithium ions as working ions even though the name of the battery is changed depending on the type of an electrolyte and a separator used in the battery, the type of packaging used to package the battery, and the internal or external structure.

Additionally, the battery is not limited by the number of elements that make up the battery. Therefore, it should be interpreted that the battery includes not only a single cell including an assembly of a positive electrode/a separator/a cathode in a packaging, and an electrolyte, but also an assembly of cells, a module including a plurality of assemblies connected in series and/or in parallel, a pack including a plurality of modules connected in series and/or in parallel, and a battery system including a plurality of packs connected in series and/or in parallel.

The lifespan of the battery is a measure of how long the battery will be available and is indicated in cycle, and this is called cycle life characteristics. That is, it indicates how many times the battery can be recharged, and in an electrical energy sense, the period of time until the fully charged battery gets fully discharged is a cycle, and the number of cycles is lifespan.

The present disclosure tracks open circuit voltage (OCV) of the battery at the same time after fully charging irrespective of cell/module/pack. The present disclosure also tracks OCV at the same time after fully discharging. When charge/discharge Coulomb efficiency is tracked in addition to the charge/discharge OCV tracking, it is possible to determine if lithium plating took place more accurately.

The present disclosure is characterized as determining a cycle in which lithium plating took place by observing the accumulated voltage at the end of charge and the accumulated voltage at the end of discharge with the increasing number of cycles, not analyzing a voltage profile in a cycle.

Hereinafter, a lithium plating detection method of the present disclosure will be described in detail using OCV after fully charging, OCV after fully discharging and Coulomb efficiency tracking graphs when lithium plating took place.

Figure 1:
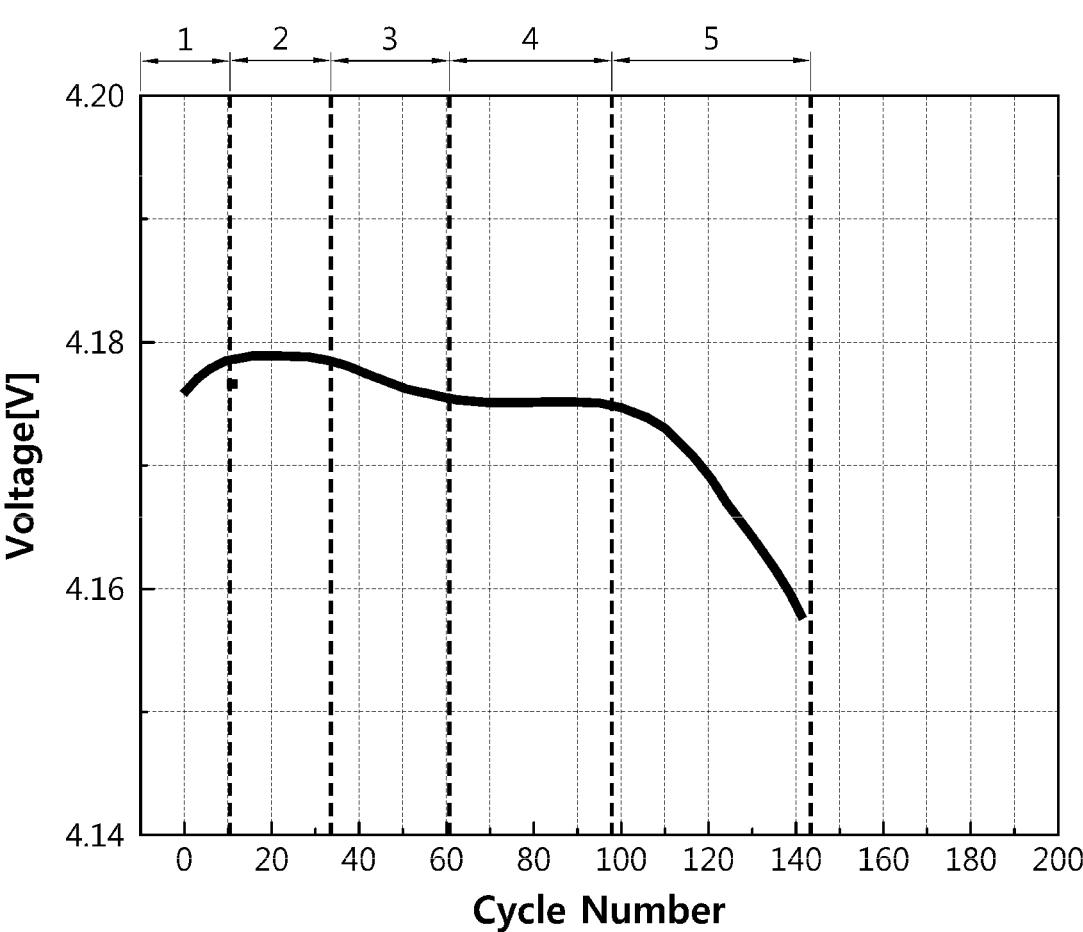
FIG. 1 is a graph showing the tracked open circuit voltage (OCV) at the same time after fully charging of a battery.
Figure 2:
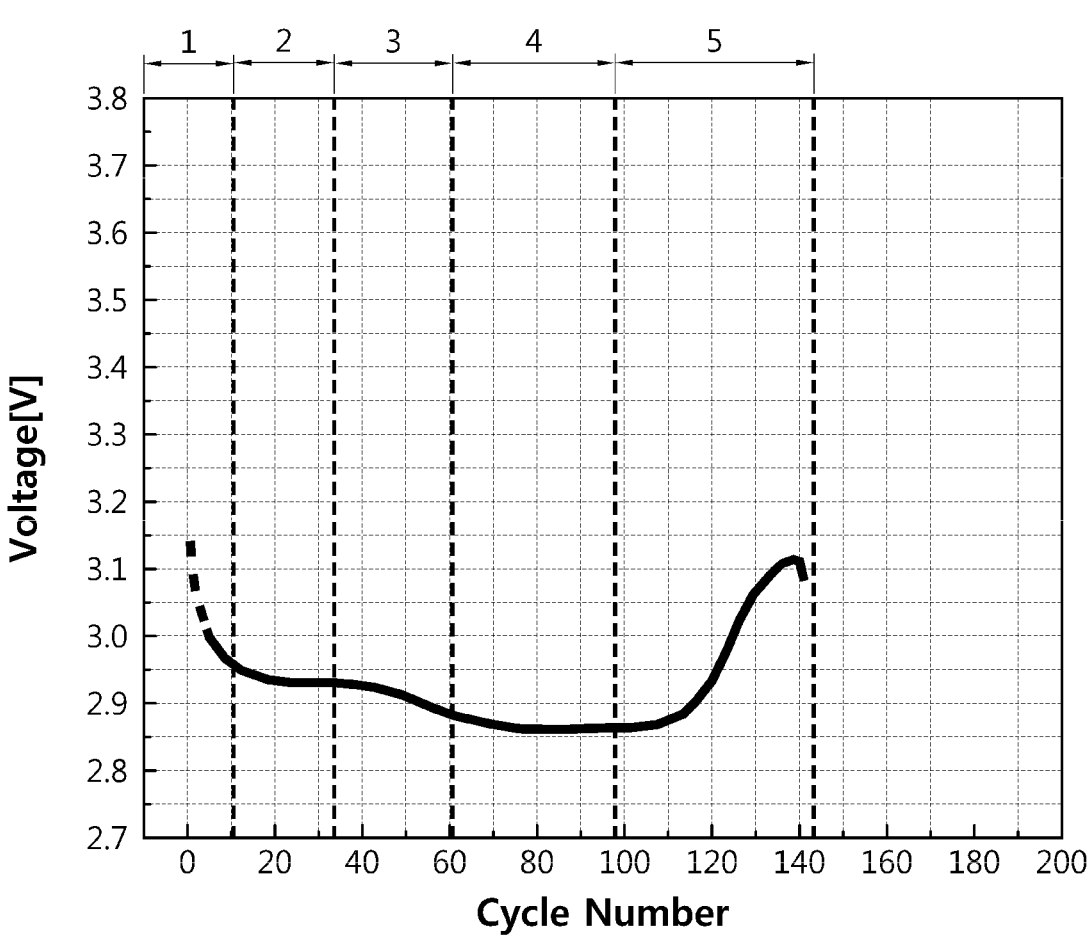
FIG. 2 is a graph showing the tracked OCV at the same time after fully discharging of a battery.
Figure 3:
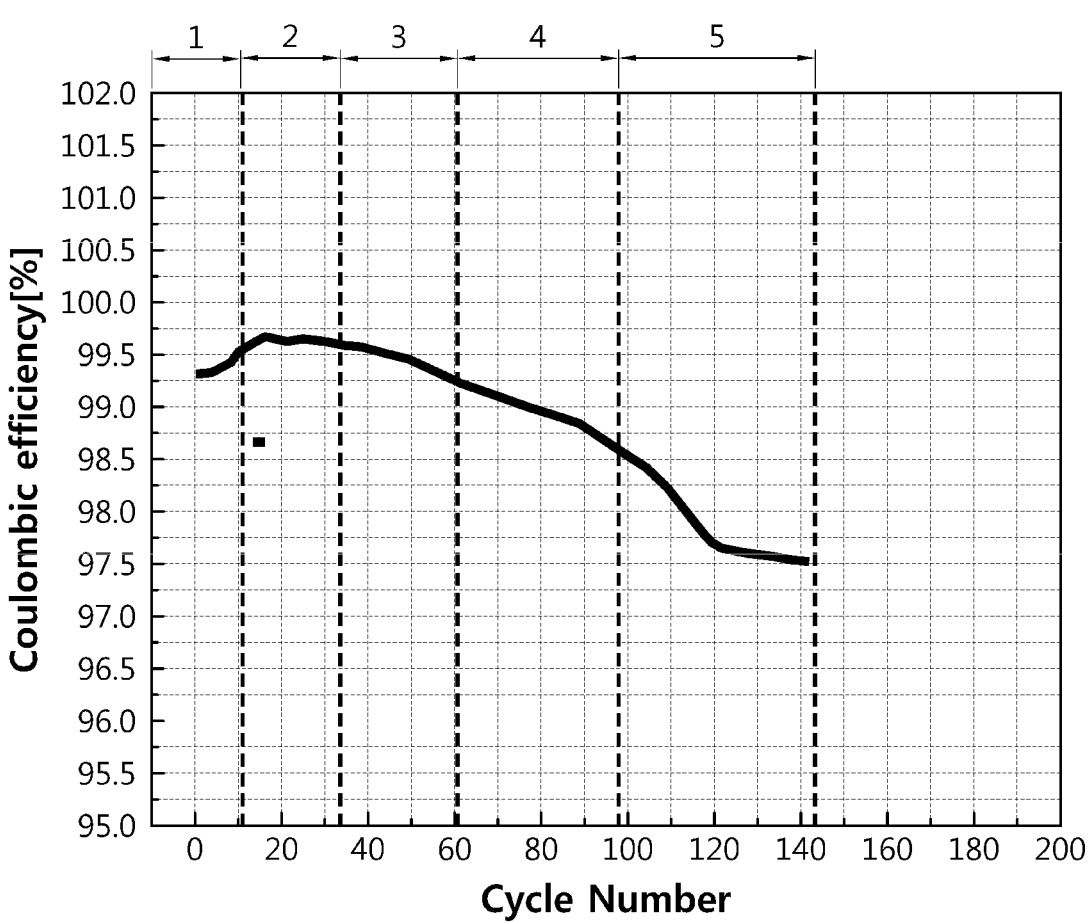
FIG. 3 is a graph showing the tracked charge/discharge Coulomb efficiency of a battery.

FIG. 1 is a graph showing the tracked OCV at the same time after fully charging of a battery. FIG. 2 is a graph showing the tracked OCV at the same time after fully discharging of the battery. FIG. 3 is a graph showing the tracked charge/discharge Coulomb efficiency of the battery.

Referring to FIG. 1, OCV is tracked at the same time after the battery is fully charged. A tracking graph showing changes in OCV after fully charging may be obtained as shown in FIG. 1 by measuring OCV during cycling in a manner of measuring OCV after first charging, followed by stabilization in a predetermined first time, measuring OCV after first discharging, followed by stabilization in a predetermined second time, measuring OCV after second charging, followed by stabilization in the first time and measuring OCV after second discharging, followed by stabilization in the second time, and then drawing the OCV after fully charging accumulated as a function of cycle number or over time. FIG. 1 is a graph showing voltage as a function of cycle number. The first time and the second time may be the same or different. The first time and the second time may be about 30 min to 1 hour, and may vary depending on the type of the battery.

Referring to FIG. 2, OCV is tracked at the same time after the battery is fully discharged. As described previously, a tracking graph showing changes in OCV after fully discharging may be obtained as shown in FIG. 2 by measuring OCV during cycling in a manner of measuring OCV after first charging, followed by stabilization in a predetermined first time, measuring OCV after first discharging, followed by stabilization in a predetermined second time, measuring OCV after second charging, followed by stabilization in the first time and measuring OCV after second discharging, followed by stabilization in the second time, and then drawing the OCV after fully discharging accumulated as a function of cycle number or over time. FIG. 2 is a graph showing voltage as a function of cycle number.

In fully charging, charge capacity may be calculated through ampere hour, and in fully discharging, discharge capacity may be calculated by the same method. Coulomb efficiency may be calculated at each cycle from the ratio between charge capacity and discharge capacity. When this is drawn as a function of cycle number or over time, a tracking graph showing changes in Coulomb efficiency may be obtained as shown in FIG. 3. FIG. 3 is a graph showing Coulomb efficiency (%) as a function of cycle number.

There is no lithium plating at the initial stage of use, and when lithium plating starts to take place while in use, as the charge and discharge cycle increases, the OCV reduces after charging ends. This feature is seen when lithium plating takes place, but only this feature is not critical in determining lithium plating, and thus the present disclosure suggests determining if such phenomena is caused by lithium plating by observing and tracking the OCV at the same time after fully discharging. According to this method, it is possible to determine the cycle number at which lithium plating took place. Additionally, it is possible to increase the lithium plating detection accuracy by observing and tracking the charge/discharge Coulomb efficiency together.

As a result of measuring and recording the OCV after fully charging, the OCV after fully discharging and the Coulomb efficiency at the same time during the charge/discharge cycle, the inventors have found that the OCV after fully charging, the OCV after fully discharging and the Coulomb efficiency slightly decrease even though the number of cycles increases when lithium plating did not take place. In particular, it looks almost unchanged when viewed in the short term. However, the inventors have found that when lithium plating takes place, each tracking graph may be divided into the following five steps or ranges as a function of cycle number, and suggest the present disclosure.

First Step

In the case of this embodiment shown in FIGS. 1 to 3, in the range of less than about 10 cycles (Range 1), the OCV after fully charging increases, the OCV after fully discharging reduces, and the Coulomb efficiency increases. This cycle number is not absolute.

When lithium plating takes place, the high potential range of the negative electrode is not used, and instead, the diffusion resistance decreases due to the expansion of the negative electrode at the early stage of cycle, and the discharge capacity increases compared to the charge capacity. Therefore, the actual discharge capacity reduces due to the lithium plating, but the Coulomb efficiency appears to increase. Although there is a difference even in normal cells at the early stage, there is a slight decrease in OCV after discharging and a slight increase in OCV after charging. The charge OCV increases because the high potential available range of the positive electrode increases.

Figure 4:
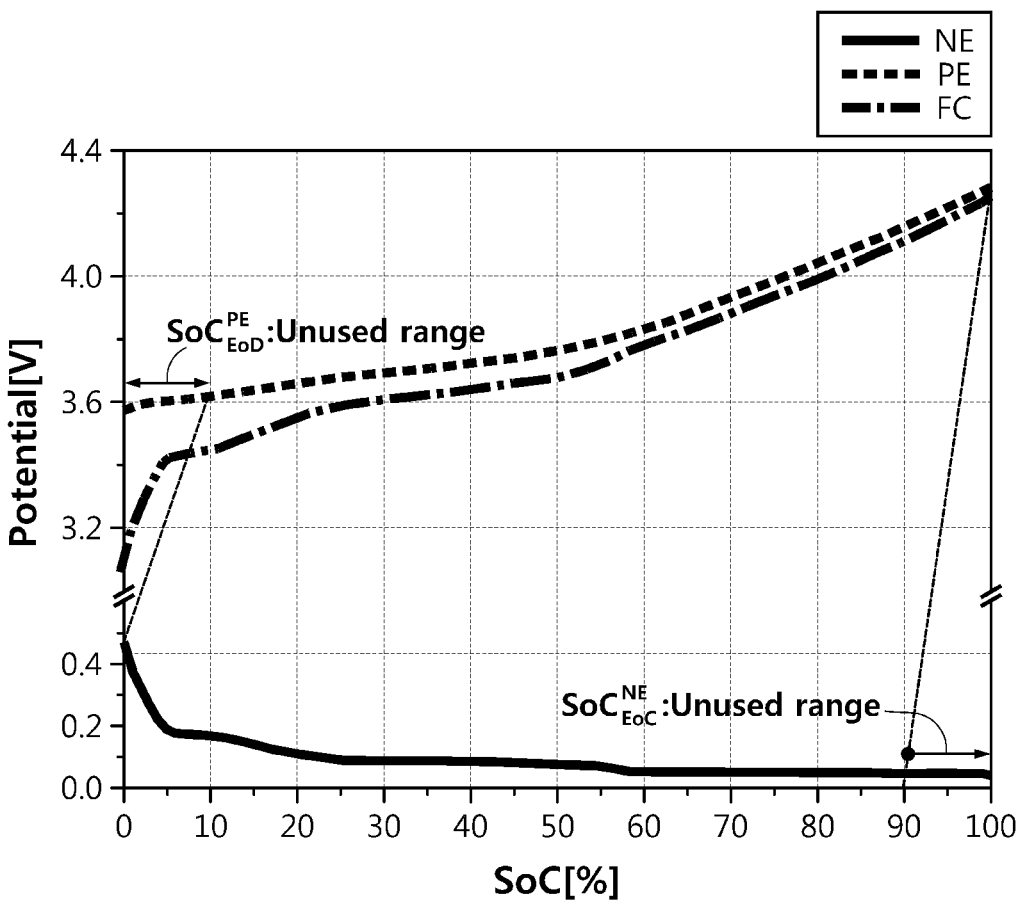
FIG. 4 is a graph showing the negative electrode potential, the positive electrode potential and the full cell voltage as a function of state of charge (SoC) in a battery.

FIG. 4 is a graph showing the negative electrode potential, the positive electrode potential and the full cell voltage as a function of the SoC in the battery. In FIG. 4, NE is the negative electrode potential, PE is the positive electrode potential, and FC is the full cell voltage. A shown in FIG. 4, when lithium plating takes place, in some cases, it is changed to inhibit the use of the negative electrode range after about SoC 90%. In this case, the negative electrode range is not used, and instead, the positive electrode range is used. Since the OCV after charging is more greatly affected by the positive electrode, as the positive electrode voltage increases, OCV also increases. Instead, the negative electrode has a larger available range for discharging. The OCV after discharging is affected by both the positive/negative electrodes, but the influence of the negative electrode is greater. During discharging, the voltage of the negative electrode increases, and the cell OCV reduces.

Second Step

In the range between about 10 and 30 cycles (Range 2 in FIGS. 1 to 3), the OCV after fully charging is maintained, the OCV after fully discharging is maintained, and the Coulomb efficiency is maintained. This cycle number is not absolute.

Since the diffusion resistance of the negative electrode does not reduce any longer, the OCV after discharging does not have a further reduction and the Coulomb efficiency does not change. In this range, lithium plating still takes place, but since discharging occurs as much as charging (the amount itself decreases), it seems to be stable. In this range, due to lithium plating occurred in the previous range, the high potential available range of the negative electrode reduces, and the high potential available range of the positive electrode increases, so with the increasing high potential available range, the OCV slope of the positive electrode sharply increases, and thus lithium plating takes place to a lower extent than the initial range. The high potential available range of the positive electrode hardly increases, and usually ends at the same point due to the positive electrode limits, and thus, OCV after charging is maintained, and since the discharge capacity is kept equal, OCV after discharging is also maintained.

Third Step

In the range between about 30 and 60 cycles (Range 3 in FIGS. 1 to 3), the OCV after fully charging reduces, the OCV after fully discharging reduces, and the Coulomb efficiency reduces. In this range, lithium plating starts to take place, and in the lithium plating detection method according to the present disclosure, it is determined as a range in which lithium plating starts to take place. Additionally, in the battery management method and apparatus using this method, it may be used as a warning point notifying that lithium plating starts to take place. This cycle number is not absolute.

With the increasing number of cycles, the resistance of the positive electrode increases, the charge OCV reduces, and thus the depth of discharge of the negative electrode increases, and the OCV of the negative electrode reduces. The amount of lithium plating can be known from the slope of Coulomb efficiency of FIG. 3 and the linear graph in the corresponding range reveals that lithium plating constantly takes place. When this range is reached, it is used as a warning point notifying the start of lithium plating, and it may be used to provide a notification to a user, for example, a driver of a vehicle having the battery.

Fourth Step

In the range between about 60 and 100 cycles (Range 4 in FIGS. 1 to 3), the OCV after fully charging is maintained, the OCV after fully discharging is maintained, and the Coulomb efficiency reduces. This cycle number is not absolute.

Not only the resistance of the positive electrode but also the resistance of the negative electrode increases due to the by-products caused by lithium plating, and the OCV after discharging starts to be constant. In the positive electrode, since the resistance already significantly increased, the resistance rise rate is low, so the OCV after charging is constant. Lithium plating continues to take place, and it is on the similar level to the previous range between 30 and 60 cycles.

Fifth Step

In the range of more than about 100 cycles (Region 5 in FIGS. 1 to 3), the OCV after fully charging sharply reduces, the OCV after fully discharging sharply increases, and the Coulomb efficiency sharply reduces. Here, the term 'sharply' represents that a change in OCV after fully charging, a change in OCV after fully discharging and a change in Coulomb efficiency in the fifth step are larger than those in the third step. This cycle number is not absolute. This range may be used as a reference for preventing the battery from being used any longer in the battery management method and apparatus according to the present disclosure.

Due to the increased negative electrode resistance, lithium plating takes place more sharply, and thus the decreasing slope (i.e., the change) of Coulomb efficiency is larger than that of the third step, and the increase in positive/negative electrode resistance becomes larger, the OCV after charging sharply decreases and the OCV after discharging sharply increases. Due to the depletion of the lithium source of lithium plating that may take place afterwards, the Coulomb efficiency reduces, but since lithium plating already took place so much, the OCV after charging continues to reduce and the OCV after discharging increases due to side reactions. The point in time at which the charge and discharge efficiency starts to sharply decrease may be used as a reference for inhibiting the use of the battery.

In the above description, the ranges 1 and 2 between about 10 and 30 cycles may not exist according to how the battery is actually used, for example, how the battery drives the electric vehicle. However, the subsequent tracking graph profile will exist when lithium plating takes place. Therefore, the tracking graph profiles of Ranges 1 and 2 are used for reference, and the tracking graph profiles of Ranges 3 to 5 are essentially used.

In view of the above description, the lithium plating detection method according to the present disclosure includes the steps of detecting the OCV after fully charging and the OCV after fully discharging of the battery every charge/discharge cycle of the battery and accumulating and tracking them, and determining if lithium plate took place in the battery using the result of tracking the OCV after fully charging and the OCV after fully discharging, and a range satisfying the condition of the reduced OCV after fully charging and the reduced OCV after fully discharging in the tracking result is determined as a range in which lithium plating starts to take place.

Preferably, the method further includes the step of calculating the Coulomb efficiency of the battery every charge/discharge cycle of the battery and accumulating and tracking it, and a range satisfying the condition of the reduced Coulomb efficiency as well in the tracking result is determined as a range in which lithium plating starts to take place.

That is, the lithium plating detection method according to the present disclosure may be a method that determines that lithium plating starts to take place when "Range 3" appears in the tracking graph of FIGS. 1 to 3. Additionally, it may be the battery management method that determines that the battery cannot be used when a range appears like "Range 5" in which the OCV after fully charging reduces, the OCV after fully discharging increases and the Coulomb efficiency reduces as the change in OCV after fully charging, the change in OCV after fully discharging and the change in Coulomb efficiency are larger than Range 3.

The present disclosure determines risk based on the accumulated information compared to the initially recorded information, and thus it is important to accumulate and store the OCV and capacity (used to calculate Coulomb efficiency) after fully charging/fully discharging.

The battery management method and apparatus according to the present disclosure uses the lithium plating detection method.

Figure 5:
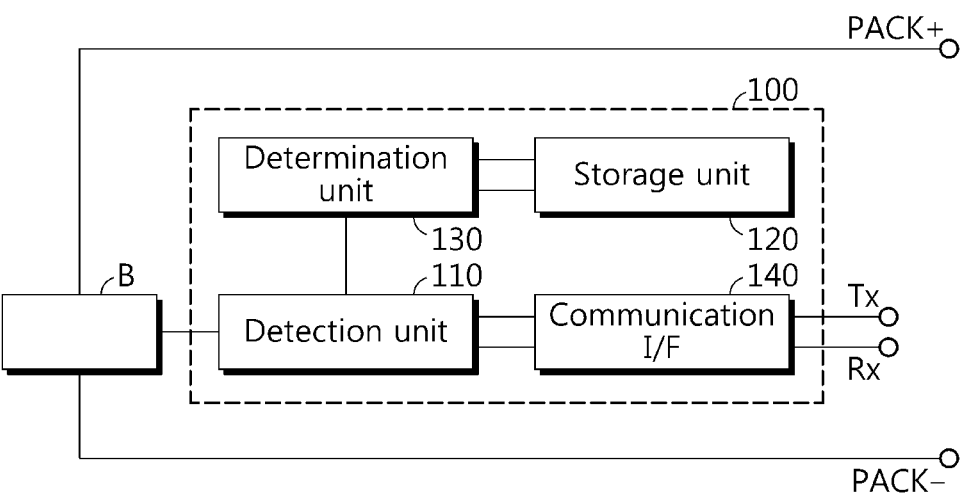
FIG. 5 is a schematic block diagram showing a configuration of a battery management apparatus according to an embodiment of the present disclosure.

FIG. 5 is a schematic block diagram showing a configuration of a battery management apparatus according to an embodiment of the present disclosure.

Referring to FIG. 5, the battery management apparatus 100 according to the present disclosure is an apparatus for determining if lithium plating took place in a battery B, and includes a detection unit 110, a storage unit 120 and a determination unit 130.

The battery B is, for example, a pack including at least one module including a plurality of cells connected in series/in parallel. The output terminals (PACK+, PACK−) of the battery B may be connected to, for example, an inverter of a vehicle system.

The determination unit 130 includes a processor capable of logical calculation, and in particular, the determination unit 130 performs the function of determining if lithium plating took place in the battery B according to the method as described below.

The storage unit 120 is a storage medium capable of recording and erasing data electrically, magnetically, optically or quantum mechanically, and non-limiting examples include RAM, ROM or register.

Preferably, the storage unit 120 may be connected to the determination unit 130, for example, via a data bus to allow the determination unit 130 to access.

The storage unit 120 may store and/or update and/or erase programs including the logics executed by the determination unit 130 and predefined parameters and/or data created when the logics are executed. The storage unit 120 may be logically split into at least two and may be included in the determination unit 130 but not limited thereto.

Preferably, the determination unit 130 is connected to the detection unit 110 to detect the state of charge of state of the battery 200. The detection unit 110 may be electrically coupled to a voltage measuring unit and a current measuring unit.

The detection unit 110 may measure the current of the battery B, the voltage of the battery B and the voltage of each cell in the battery B using the voltage measuring unit and the current measuring unit, and transmit the same to the storage unit 120 or the determination unit 130. In particular, the detection unit 110 detects the OCV after fully charging and the OCV after fully discharging every charge/discharge cycle of the battery B, and transmit the same to the storage unit 120 or the determination unit 130. When discharging ends before the battery is fully discharged, the detection unit 110 may measure the OCV after discharging ends, estimate the OCV after fully discharging by extrapolation and record the same.

The voltage measuring unit may include a well-known voltage measuring circuit to periodically measure the voltage of the battery B at a predetermined time interval under the control of the determination unit 130, and the measured voltage value may be outputted to the determination unit 130. The determination unit 130 may store the periodically inputted measured voltage value in the storage unit 120.

The current measuring unit may include a sense resistor or a Hall sensor to measure the magnitude of the charge current or the discharge current of the battery B at a time interval under the control of the determination unit 130, and the measured current value may be outputted to the determining range 130. The determination unit 130 may store the periodically inputted measured current value in the storage unit 120. The measured current value may be used to calculate the charge capacity, the discharge capacity and the Coulomb efficiency.

That is, the determination unit 130 accumulates the current value I sensed by the current measuring unit at each predetermined time t, calculates the charge electricity quantity and the discharge charge electricity quantity, and calculates the charge capacity and the discharge capacity of the battery B from the calculated charge electricity quantity and the calculated discharge charge electricity quantity. Additionally, the determination unit 130 obtains the voltage V of the battery B sensed by the voltage measuring unit at each predetermined time t, in combination with ampere hour. Additionally, the determination unit 130 obtains the OCV after the first time has passed since fully charging and the OCV after the second time has passed since fully discharging.

The charge capacity, the discharge capacity, the Coulomb efficiency, the OCV after fully charging and the OCV after fully discharge may be continuously monitored. The determination unit 130 may detect lithium plating using the monitoring results. That is, the lithium plating detection method according to the present disclosure may be performed by the determination unit 130, and the determination unit 130 may determine if lithium plating took place in the battery B.

To this end, the storage unit 120 may accumulate and record the detection results by the detection unit 110. The OCV after fully charging, the OCV after fully discharging and the Coulomb efficiency may be accumulated and stored in the storage unit 120 every charge/discharge cycle of the battery B.

The determination unit 130 may estimate the SoC and the state of health (SoH) of the battery B based on the current of the battery B, the voltage of the battery B, and the voltage of each cell in the battery B received from the detection unit 110 to generate information indicating the condition of the battery B and transmit the same to the ECU of the vehicle system. Additionally, the storage unit 120 may store data including the current SoC, SoH, the voltage of the battery B and the electric current of the battery B when the battery management apparatus 100 is powered off.

The determination unit 130 may be coupled to a communication interface (I/F) 140 and may output the current SoC and SoH to an external device (not shown) through the communication interface 140. The communication interface 140 may include input/output terminals Tx, Rx. For example, the ECU of the vehicle system may receive the SoH of the battery B from the determination unit 130 through the communication interface 140 of the battery management apparatus 100 from the transmitted battery B and display the same on a display device of the vehicle such as a dashboard (not shown).

In particular, the determination unit 130 may compare the immediately previous detected and recorded OCV after fully charging with the newly detected and recorded OCV after fully charging, compare the immediately previous detected and recorded OCV after fully discharging with the newly detected and recorded OCV after fully discharging, and determine whether each increases, reduces or is maintained. The determination unit 130 may calculate its changes. The determination and calculation results may be stored in the storage unit 120. As described above, when the condition of the reduced OCV after fully charging and the reduced OCV after fully discharging is satisfied, it is determined that lithium plating starts to take place. Further, since the Coulomb efficiency is also accumulated and recorded for every charge/discharge cycle of the battery B, the determination unit 130 may compare the previously recorded Coulomb efficiency with the newly recorded Coulomb efficiency and determine whether the Coulomb efficiency increases, reduces or is maintained. The determination unit 130 may calculate its changes. The determination and calculation results may be further stored in the storage unit 120. In addition to the condition of the reduced OCV after fully charging and the reduced OCV after fully discharging, when the condition of the reduced Coulomb efficiency is satisfied, the determination unit 130 may determine that lithium plating started to take place.

In case where the battery B is a battery mounted in an electric vehicle, when lithium plating starting to take place in the battery B is determined by the determination unit 130, the information transmitted from the determination unit 130 through the communication interface 140 may be displayed as "warning" on the display device of the vehicle system such as the dashboard (not shown) to warn the user. When receiving the warning, the user may recognize that lithium plating started to take place in the battery B.

The tracking graph of the battery B in which lithium plating took place is shown as described above with reference to FIGS. 1 to 3. Since the determination unit 130 compares the immediately previous detected and recorded OCV after fully charging with the newly detected and recorded OCV after fully charging, compare the immediately previous detected and recorded OCV after fully discharging with the newly detected and recorded OCV after fully discharging, compares the previously recorded Coulomb efficiency with the newly recorded Coulomb efficiency, and determines whether each increases, reduces or is maintained, and even calculate their changes, the tracking graphs of FIGS. 1 to 3 are prepared in real time. When the determination unit 130 determines that lithium plating starts to take place in Range 3 of FIGS. 1 to 3, for example, and then determines that the OCV after fully charging reduces, the OCV after fully discharging increases and the Coulomb efficiency reduces to a greater extent than those of Range 3, i.e., Range 5 is reached, the determination unit 130 determines that the battery B is impossible to use.

When the battery B is determined to be impossible to use by the determination unit 130, the charging of the battery B may be temporarily stopped. The temporary charging stop may be performed through a control command for the charge/discharge circuit of the battery B. An I/O interface may be further included in the processor of the determination unit 130 to control the charge/discharge circuit so that the determination unit 130 may control the charge/discharge circuit.

The battery management apparatus 100 according to the present disclosure may be included as part of a battery management system (BMS) in the battery. In particular, the determination unit 130 may be implemented in a main unit controller (MCU) of the BMS. Additionally, the BMS may be mounted on various types of electricity operated devices that work by the electrical energy supplied from the battery B.

According to an aspect, the electricity operated devices may be mobile computer devices including mobile phones, laptop computers, tablet computers or handheld multimedia devices including digital cameras, video cameras and audio/video players.

According to another aspect, the electricity operated devices may be electricity powered devices that can move by electricity, such as electric vehicles, hybrid electric vehicles, electric bikes, electric motorcycles, electric trains, electric ship, electric airplanes, etc., or power tools with motors such as electric drills and electric grinders.

According to still another aspect, the electricity operated devices may be high capacity power storage systems installed in an electrical grid to store renewable energy or surplus power, or uninterruptible power supplies to supply power to various types of information communication devices including server computers or mobile communication devices in emergency situations such as a power failure.

In describing various embodiments of the present disclosure, the components with the suffix "unit" should be understood as functionally separable elements rather than physically separable elements. Accordingly, each component may be optionally integrated with other components or each component may be split into sub components for efficient execution of the logic(s). However, it is obvious to those skilled in the art that the integrated or split components should be interpreted as reside in the scope of the present disclosure when the functions are considered identical even though the components are integrated or split.

Meanwhile, the determination unit 130 may selectively include processors, Application-Specific Integrated Circuits (ASIC), chipsets, logic circuits, registers, communication modems and data processing devices known in the art to execute a variety of logics disclosed herein.

Additionally, when the logic is implemented in software, the determination unit 130 may be implemented as a set of program modules. In this instance, the program module may be stored in the storage unit 120 and executed by the processor. The storage unit 120 may be inside or outside of the processor, and may be connected to the processor via a variety of well-known means.

Figure 6:
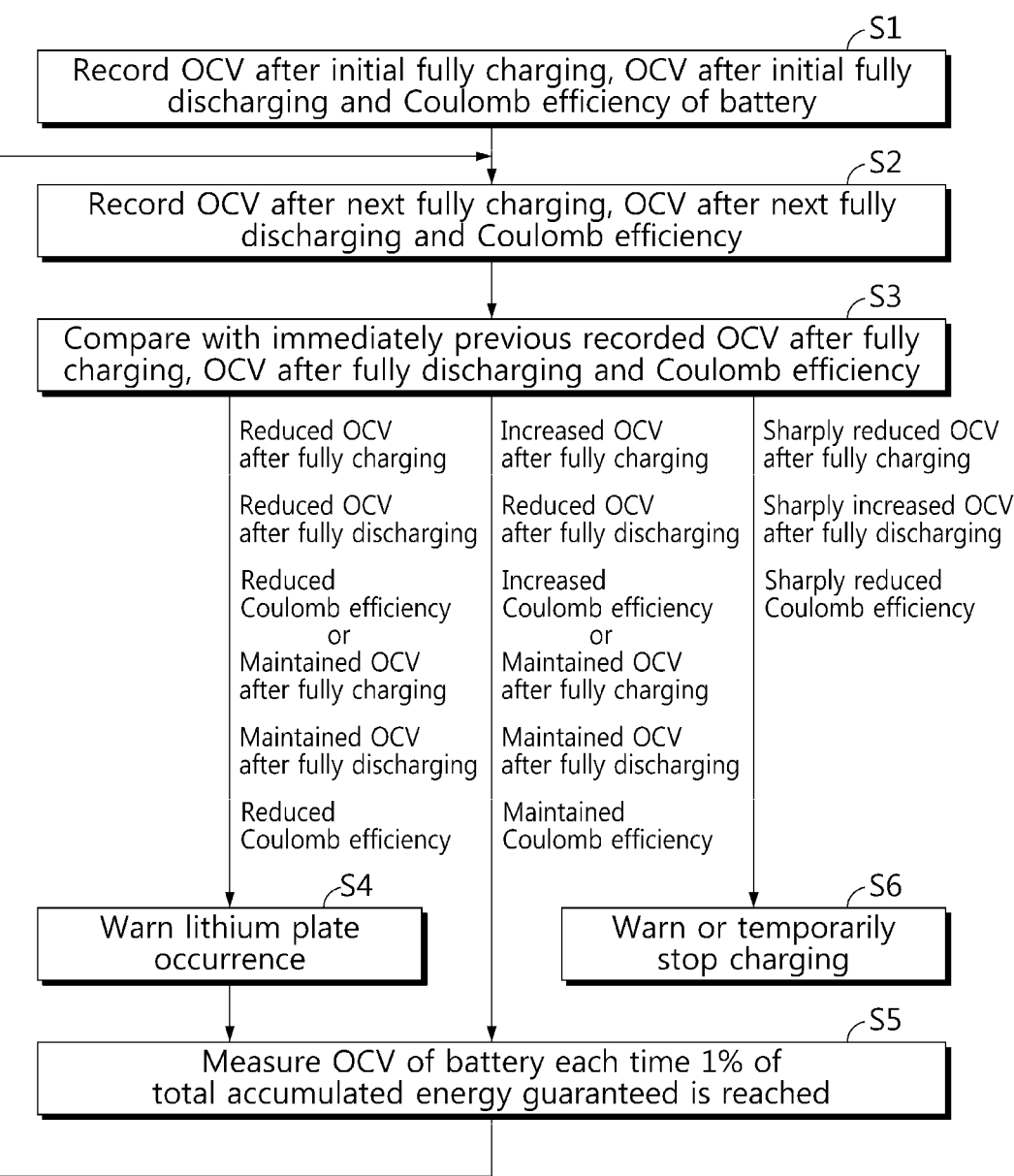
FIG. 6 is a flowchart showing a battery management method according to an embodiment of the present disclosure.

Hereinafter, a battery management method according to the present disclosure will be described in more detail with further reference to FIG. 6 based on the above-described configuration. FIG. 6 is a flowchart showing a battery management method according to an embodiment of the present disclosure.

The battery management apparatus 100 described with reference to FIG. 5 may be used to perform the battery management method.

Referring to FIG. 6, OCV after initial fully charging and OCV after initial fully discharging of the battery are detected and recorded (s1). In this step, Coulomb efficiency of the battery may be calculated and further recorded. For example, after an electric vehicle having the battery at (birth of life) BOL is delivered, OCV after fully charging and OCV after fully discharging of the battery at BOL is detected by the user in the first charge/discharge cycle, and this is used as a reference point. Since risk is determined based on accumulated information compared to initially recorded information, it is important to continuously accumulate and store OCV and capacity (used to calculate Coulomb efficiency) after fully charging/fully discharging.

Next, OCV after next fully charging and OCV after next fully discharging of the battery are detected and recorded (s2). Also in this step, Coulomb efficiency of the battery may be calculated and further recorded. When discharging ends before the battery is fully discharged, OCV after discharging is measured, and OCV after fully discharging is estimated by extrapolation and recorded.

The immediately previous detected and recorded OCV after fully charging and the newly detected and recorded OCV after fully charging are compared, and the immediately previous detected and recorded OCV after fully discharging and the newly detected and recorded OCV after fully discharging are compared, and determination is made as to whether each increases, reduces or is maintained (s3). Their changes may be recorded.

Additionally, in this step, determination is made as to whether Coulomb efficiency increases, reduces or is maintained by comparing the immediately previous recorded Coulomb efficiency with the newly recorded Coulomb efficiency and its changes may be recorded.

When the OCV after fully charging increases, the OCV after fully discharging reduces and the Coulomb efficiency increases, or the OCV after fully charging, the OCV after fully discharging and the Coulomb efficiency are all maintained at s3, it corresponds to Ranges 1 and 2 as described with regard to FIGS. 1 to 3, and it is before lithium plating takes place, and moves to the next step.

When at least the condition of the reduced OCV after fully charging and the reduced OCV after fully discharging is satisfied at s3, it is determined that lithium plating starts to take place. When the condition of the reduced Coulomb efficiency is satisfied as well, the accuracy of determination that lithium plating starts to take place may be improved. This corresponds to Range 3 in FIGS. 1 to 3. When it is determined that lithium plating starts to take place, it is used as a warning point to the user (s4).

Subsequently, s2 and s3 are repeatedly performed.

While these steps are repeatedly performed, each time 1% of the total accumulated energy guaranteed is reached, the step of measuring the OCV of the battery is further performed (s5). In s5, the OCV measurement of the battery is performed from SoC 0% to SoC 100% at 0.05 C in the charging direction. s5 is performed to periodically check the battery. The vehicle user may perform s5 in an automobile repair shop.

Subsequently, s2 and s3 are repeatedly performed in that order.

As described in FIGS. 1 to 3, when the OCV after fully charging and the OCV after fully discharging are maintained, and the Coulomb efficiency reduces after the start of lithium plating, it corresponds to Ranges 3 and 4 and is a range in which lithium plating takes place. When it is determined as the lithium plating occurrence range, s4 is performed. When the OCV after fully charging, the OCV after fully discharging and the Coulomb efficiency at s3 reduces, increases and reduces, respectively, to a greater extent than the extent of change in the lithium plating occurrence range, that is, when the OCV after fully charging, the OCV after fully discharging and the Coulomb efficiency sharply change, it corresponds to Range 5 in FIGS. 1 to 3, and it is determined that the battery is impossible to use. When the battery is determined to be impossible to use, it is used as a warning point to the user or charging of the battery may be temporarily stopped (s6).

The battery management method according to the present disclosure determines a point in time at which lithium plating took place using the lithium plating detection method and the battery management apparatus according to the present disclosure and uses as a warning point to diagnose safety while the battery is in use. Additionally, when the battery is determined to be impossible to use, it is used as a warning point to the user or to temporarily stops charging the battery, in order to prevent the degraded battery from being used, thereby ensuring safety.

At least one of the logics shown in FIG. 6 may be combined and the combined logics may be written in computer-readable code and stored in computer-readable recording media. The recording media include, but not limited to, any type of recording media that is accessible by processors included in computers and. By way of illustration, the recording media include at least one selected from the group consisting of ROM, RAM, register, CD-ROM, magnetic tape, hard disks, floppy disk, and an optical data recording device. Additionally, the code may be modulated into carrier signals and included in communication carriers at a specified time, and may be stored and executed in computers connected via a network in a distributed manner. Additionally, functional programs, codes, and code segments for implementing the combined logics may be easily inferred by programmers in the technical field to which the present disclosure pertains.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the scope of the appended claims and their equivalents.

What is claimed is:

1. A battery management apparatus comprising:
   a detection unit configured to generate a detection by detecting an open circuit voltage (OCV) after fully charging after every charge cycle and an OCV after fully discharging after every discharge cycle of a battery for a plurality of charge and discharge cycles;

a storage unit configured to accumulate results of the detection by the detection unit; and a determination unit configured to determine whether each of the OCV after fully charging and the OCV after fully discharging increases, reduces or is maintained by comparing a detected and recorded OCV after fully charging in one charge cycle with a newly detected and recorded OCV after fully charging in a charge cycle immediately after the one charge cycle, and comparing a detected and recorded OCV after fully discharging with a newly detected and recorded OCV after fully discharging in a discharge cycle immediately after the one discharge cycle, wherein the determination unit determines that lithium plating starts to take place when OCV after fully charging in the charge cycle immediately after the one charge cycle and OCV after fully discharging in the discharge cycle immediately after the one discharge cycle are both reduced.

2. The battery management apparatus according to claim 1, wherein the determination unit generates a calculation by calculating a Coulomb efficiency every charge and discharge cycle of the battery, the storage unit further accumulates the calculation by the determination unit, and the determination unit further determines whether the Coulomb efficiency increases, reduces or is maintained by comparing an immediately previous recorded Coulomb efficiency with a newly recorded Coulomb efficiency, and the determination unit determines that lithium plating starts to take place when a condition of a reduced Coulomb efficiency is satisfied as well.

3. The battery management apparatus according to claim 1, wherein the battery is a battery mounted on an electric vehicle, when it is determined that lithium plating starts to take place in the battery by the determination unit, a warning is provided to a user.

4. The battery management apparatus according to claim 1, wherein a lithium plating occurrence range is from a point in time at which lithium plating starts to take place to a point in time at which the OCV after fully charging and the OCV after fully discharging start to be maintained, and the determination unit determines that the battery is inoperable when (i) the OCV after fully charging reduces and (ii) the OCV after fully discharging increases by amounts greater than respective amounts of change in the lithium plating occurrence range.

5. The battery management apparatus according to claim 2, wherein a lithium plating occurrence range is from a point in time at which lithium plating starts to take place to a point in time at which the OCV after fully charging and the OCV after fully discharging are maintained, and the determination unit determines that the battery is inoperable when (i) the OCV after fully charging reduces, (ii) the OCV after fully discharging increases, and (iii) the Coulomb efficiency reduces by amounts greater than respective amounts of change in the lithium plating occurrence range.

6. The battery management apparatus according to claim 1, wherein when discharging ends before the battery is fully discharged, the detection unit detects the OCV after the discharging ends, estimates the OCV after fully discharging by extrapolation and records the same.

7. The battery management apparatus according to claim 4, wherein when the battery is determined to be inoperable by the determination unit, the charging of the battery is stopped.

8. The battery management apparatus according to claim 2, wherein the battery is a battery mounted on an electric vehicle, when it is determined that lithium plating starts to take place in the battery by the determination unit, a warning is provided to a user.

9. The battery management apparatus according to claim 5, wherein when the battery is determined to be inoperable by the determination unit, the charging of the battery is stopped.

* * * * *